US008094323B2

(12) United States Patent
Kapner

(10) Patent No.: US 8,094,323 B2
(45) Date of Patent: Jan. 10, 2012

(54) DISPLACEMENT ENCODER INCLUDING PHOSPHOR ILLUMINATION SOURCE

(75) Inventor: Daniel J. Kapner, Seattle, WA (US)

(73) Assignee: Mitutoyo Corporation, Kawasaki-shi (JP)

( * ) Notice: Subject to any disclaimer, the term of this patent is extended or adjusted under 35 U.S.C. 154(b) by 411 days.

(21) Appl. No.: 12/493,088

(22) Filed: Jun. 26, 2009

(65) Prior Publication Data
US 2010/0328681 A1 Dec. 30, 2010

(51) Int. Cl.
*G01B 11/14* (2006.01)
*G01D 5/34* (2006.01)
(52) U.S. Cl. ............... 356/616; 250/231.13; 250/231.18
(58) Field of Classification Search .......... 356/315–317; 250/231.13, 231, 16, 231.18
See application file for complete search history.

(56) References Cited

U.S. PATENT DOCUMENTS

| | | |
|---|---|---|
| 3,882,482 A | 5/1975 | Green |
| 4,109,389 A | 8/1978 | Balcom |
| 4,414,754 A | 11/1983 | Lapeyre |
| 4,631,519 A | 12/1986 | Johnston |
| 4,814,667 A | 3/1989 | Tanaka |
| 4,859,845 A | 8/1989 | Sakano |
| 4,928,008 A | 5/1990 | Huggins |
| 4,964,727 A | 10/1990 | Huggins |
| 5,010,655 A | 4/1991 | Rieder |
| 5,017,771 A | 5/1991 | Bartholomew |
| 5,104,225 A | 4/1992 | Masreliez |
| 5,129,725 A | 7/1992 | Ishizuka |
| 5,218,199 A | 6/1993 | Miller |
| 5,237,391 A | 8/1993 | Huggins |
| 5,279,044 A | 1/1994 | Bremer |
| 5,442,166 A | 8/1995 | Hollmann |
| 5,576,830 A | 11/1996 | O'Brien |
| 5,773,820 A | 6/1998 | Osajda |
| 5,813,753 A | 9/1998 | Vriens |
| 5,886,519 A | 3/1999 | Masreliez |

(Continued)

FOREIGN PATENT DOCUMENTS
WO 2007/042962 A1 4/2007

OTHER PUBLICATIONS

Dolan, R.P. (ed.), "Hewlett-Packard Journal," Hewlett-Packard Company, Palo Alto, Calif., Sep. 1980, vol. 31, No. 9, <http://www.hparchive.com>, 32 pages.

*Primary Examiner* — Layla Lauchman
(74) *Attorney, Agent, or Firm* — Christensen O'Connor Johnson Kindness PLLC

(57) ABSTRACT

A position sensing optical encoder includes an illumination source that operates by providing primary radiation having a first level of intensity uniformity to saturate at least a portion of a relatively broad phosphor area including uniformly distributed phosphor. The phosphor area absorbs the primary radiation and emits phosphor radiation to illuminate the encoder scale pattern. The scale pattern spatially modulates the phosphor light, and the spatially modulated pattern of phosphor light is sensed by a photodetector arrangement. Due at least partially to saturation of the phosphor, the phosphor light has a second level of phosphor light intensity uniformity that is more uniform than the first level of primary light intensity uniformity, which enhances the encoder accuracy. The uniform phosphor illumination intensity is economically provided over a broad area with few components and minimized optical path length, particularly for path length perpendicular to the scale.

20 Claims, 5 Drawing Sheets

U.S. PATENT DOCUMENTS

| | | | |
|---|---|---|---|
| 5,965,879 | A | 10/1999 | Leviton |
| 6,232,594 | B1 | 5/2001 | Eccher |
| 6,271,661 | B2 | 8/2001 | Andermo |
| 6,329,676 | B1 | 12/2001 | Takayama |
| 6,347,874 | B1 | 2/2002 | Boyd |
| 6,450,664 | B1 | 9/2002 | Kelly |
| 6,486,467 | B1 | 11/2002 | Speckbacher |
| 6,519,044 | B1 | 2/2003 | Holzapfel |
| 6,664,535 | B1 | 12/2003 | Nahum |
| 6,781,694 | B2 | 8/2004 | Nahum |
| 6,794,638 | B2 | 9/2004 | Aoki |
| 6,867,412 | B2 | 3/2005 | Patzwald |
| 6,888,126 | B2 | 5/2005 | Blasing |
| 7,186,969 | B2 | 3/2007 | Shimomura |
| 7,262,550 | B2 | 8/2007 | Erchak |
| 7,295,324 | B2 | 11/2007 | Jones |
| 7,307,736 | B2 | 12/2007 | Tobiason |
| 7,357,554 | B2 | 4/2008 | Weber |
| 7,368,705 | B2 | 5/2008 | Hare |
| 7,462,815 | B2 | 12/2008 | Chua |
| 7,608,813 | B1 * | 10/2009 | Milvich et al. ............ 250/231.13 |
| 7,732,755 | B2 * | 6/2010 | Chin et al. ................ 250/231.13 |
| 2006/0284062 | A1 | 12/2006 | Altendorf |
| 2007/0131853 | A1 | 6/2007 | Chua |
| 2008/0231911 | A1 | 9/2008 | Scott |
| 2009/0101930 | A1 | 4/2009 | Li |

* cited by examiner

DISPLACEMENT ENCODER INCLUDING PHOSPHOR ILLUMINATION SOURCE

FIELD OF THE INVENTION

The invention relates generally to precision measurement instruments, and more particularly to a displacement encoder that utilizes a phosphor illumination source.

BACKGROUND OF THE INVENTION

Various optical displacement encoders are known that use a readhead having an optical arrangement that images a scale pattern to a photodetector arrangement in the readhead. The image of the scale pattern displaces in tandem with the scale member, and the movement or position of the displaced scale pattern image is detected with a photodetector arrangement. Conventional imaging, self-imaging (also called Talbot imaging), and/or shadow imaging may be used to provide the scale pattern image in various configurations.

Optical encoders may utilize incremental or absolute position scale structures. An incremental position scale structure allows the displacement of a readhead relative to a scale to be determined by accumulating incremental units of displacement, starting from an initial point along the scale. Such encoders are suitable for certain applications, particularly those where line power is available. However, in low power consumption applications (e.g., battery powered gauges, and the like), it is more desirable to use absolute position scale structures. Absolute position scale structures provide a unique output signal, or combination of signals, at each position along a scale. They do not require continuous accumulation of incremental displacements in order to identify a position. Thus, absolute position scale structures allow various power conservation schemes. A variety of absolute position encoders are known, using various optical, capacitive or inductive sensing technologies. U.S. Pat. Nos. 3,882,482; 5,965,879; 5,279,044; 5,886,519; 5,237,391; 5,442,166; 4,964,727; 4,414,754; 4,109,389; 5,773,820; and 5,010,655, disclose various encoder configurations and/or signal processing techniques relevant to absolute position encoders, and are hereby incorporated herein by reference in their entirety.

One issue with regard to the design of optical encoders is that users generally prefer that the readheads and scales of the encoders be as compact as possible. A compact encoder is more convenient to install in a variety of applications. However, absolute optical encoders generally require a plurality of scale tracks, which tends to demand a relatively broader scale member, illumination system, and photodetector arrangement. One solution has been to minimize the width of absolute scale tracks. However, minimizing the width of scale tracks, the illumination system, and photodetector arrangement is generally detrimental to the signal to noise ratio(s) of an absolute encoder, reducing its potential accuracy. Furthermore, narrower scale tracks are relatively more sensitive to a given amount of contamination, misalignment, and other variations that may be expected in industrial environments, and are therefore less robust and stable in operation. Thus, in particular with regard to absolute optical encoders, it would be desirable to maintain relatively larger scale track widths, in order to maintain accuracy as robustly as possible, while otherwise maintaining as compact an optical encoder configuration as possible. However, the prior art fails to teach configurations which provide certain combinations of robustness, compact size, range-to-resolution ratio, and cost desired by users of encoders. Improved configurations of encoders that provide such combinations would be desirable.

SUMMARY OF THE INVENTION

This summary is provided to introduce a selection of concepts in a simplified form that are further described below in the Detailed Description. This summary is not intended to identify key features of the claimed subject matter, nor is it intended to be used as an aid in determining the scope of the claimed subject matter. In general, unless otherwise indicated by explicit description or context, when referring to the "phosphor" herein, the reference includes not only the light-emitting phosphor molecules, but also includes any carrier or substance that surrounds the phosphor molecules and facilitates their application and/or protection on a substrate.

The present invention is directed to improved displacement encoder configurations that provide improved combinations of compact size, robustness, range-to-resolution ratio, high resolution, and fabrication and assembly cost.

Ideally, in optical displacement encoders the shape of the area of the moving scale pattern, which determines the shape of the spatially modulated light pattern that overlaps the photodetector, should be the sole determinant of the displacement signal. In addition, in order to increase the robustness of the encoder operation, it is generally desirable to increase the area of the scale pattern that governs the spatially modulated light pattern to a practical maximum, such that any contamination that may be introduced on the scale disrupts as little as possible of the desired signal-generating light pattern. However, illumination non-uniformity may cause extraneous intensity variations within the spatially modulated light pattern on the photodetector, such that the accuracy of the displacement signal is degraded. Conventionally, lenses and/or diffusers are positioned axially along an optical path in order to expand the beam of a light source and provide a uniform intensity distribution across the portion of the scale pattern that is to be imaged. However, the required length of an optical path including such elements (e.g., a lens) prevents the encoder configuration from being made more compact along the optical axis, particularly as the area of the scale pattern that is included in the optical path is increased.

In accordance with one embodiment of the present invention, uniform light intensity is achieved without the use of a lens, by utilizing a primary light source to excite and saturate a phosphor area which then provides uniform illumination to a scale pattern. In one specific embodiment, the primary light source may provide non-uniform primary radiation that approximately saturates an area of uniformly distributed phosphor that absorbs the primary radiation at a first wavelength, the saturated phosphor then providing a "secondary" phosphor radiation at a second wavelength that illuminates the scale with a relatively uniform intensity to produce a scale pattern "image" (e.g., a shadow image) that is sensed by the photodetector. Due to saturation of the phosphor, the uniformity of the intensity of the secondary radiation may be similar to the uniformity of the saturated volume of the phosphor. Uniform illumination intensity may therefore be economically provided over a wide area with relatively few components, in a configuration that minimizes the path length and encoder size along a direction normal to the plane of the scale pattern. Other advantages include the ability to match the phosphor wavelength to the maximum sensitivity of the photodetector (e.g., for better signal-to-noise ratio and energy efficiency); patterning the phosphor to provide an economical source grating for self imaging type displacement encoders; and using the phosphor to provide diffuse illumination in applications where such is more desirable than directional illumination of the type typically provided by primary radiation sources (e.g., LEDs, laser diodes, etc.).

It will be appreciated that the intensity uniformity provided by the phosphor is improved over that obtained directly from a primary radiation source (e.g., a LED primary source, an interposed diffuser, etc.). In addition, the improved uniformity is achieved along a very short optical path. In other words, the saturated phosphor used in combination with a high divergence primary light source results in a configuration with a large illumination area and a very short optical path, which is desirable for achieving a more compact encoder configuration.

In accordance with another aspect of the invention, the uniformity of the phosphor light from the phosphor may depend on the phosphor thickness and how uniformly the light-emitting phosphor molecules are distributed within the phosphor volume. In one embodiment, the phosphor molecules are suspended in a well-mixed carrier (e.g., such that the phosphor molecules are uniformly distributed in the carrier volume) and then spin-coated onto a flat substrate, or else the phosphor is distributed using other known techniques, such that uniform thickness and density of the phosphor is achieved. In one embodiment, the absolute scale tracks may be illuminated by a continuous phosphor area, while the incremental scale track is illuminated by a patterned phosphor area (e.g., as may be formed through a photo-resist/etch process or a laser etch). The patterned phosphor may serve as a source grating that facilitates providing the detected image of the incremental scale track by using known self-imaging techniques. In another embodiment, the absolute scale tracks may also be illuminated by a phosphor area patterned to form a source grating (that is, a periodic array of line sources), even in embodiments where the absolute scale tracks are imaged using conventional or shadow imaging techniques. In some embodiments, the primary light source wavelength may be outside the range of the detector response, or eliminated from the detector response using a wavelength filter in the optical path, so as to have only the phosphor light from the phosphor be involved determining the encoder displacement signals. It will be appreciated that the phosphor response time may be very fast (e.g., on the order of microseconds), which is ideal for certain applications (e.g., a low power pulsed optical ABS encoder system).

In some embodiments, a scale configuration usable with the present invention comprises a scale element including an absolute scale pattern comprising a fine track pattern and at least a first absolute track pattern. The various track patterns are arranged to receive light from the phosphor and output respective track-specific spatially modulated light patterns along respective light paths to various corresponding detector portions of the detector electronics (e.g., a fine track detector portion and at least a first absolute track detector). The fine track pattern and its corresponding detector portion may be configured according to known techniques (e.g., using conventional imaging, shadow imaging, or self-imaging techniques and known detector structures to generate periodic displacement signals). As previously indicated, in some embodiments, the phosphor area for illuminating the fine track pattern may be patterned as a source grating (e.g., to provide spatially coherent light, as is desirable when using self-imaging techniques to generate a scale image from a grating-like scale pattern).

In some embodiments an absolute track detector portion may be configured with individual photodetector areas that have a Y direction edge-to-edge dimension YDETABS along a Y direction that is perpendicular to a measuring axis direction, and these photodetector areas may be configured to spatially filter their received spatially modulated light pattern and output a plurality of respective position indicating signals that have respective spatial phases. In one embodiment, the absolute track pattern comprises geometrically congruent subtrack portions that extend along the measuring axis direction, and the geometrically congruent subtrack portions are arranged such that if one of the geometrically congruent portions is translated along the Y axis direction by the dimension YDETABS, then the geometrically congruent portions will nominally coincide. The geometrically congruent subtrack portions may furthermore be configured such that they are separated along the Y direction by a dimension YCENT that is less than YDETABS, and the geometrically congruent subtrack portions may each have a Y direction dimension YTOL, such that the dimensional quantity [YCENT+2 (YTOL)] is greater than YDETABS. Thus, the detector portion for sensing the absolute track may be narrower than the absolute track pattern along the Y direction, but because the ends of the photodetectors are each nominally located over geometrically congruent subtrack portions (to sense geometrically congruent light patterns), the detected signal is not sensitive to misalignment of the detector portion along the Y direction. It will be appreciated that a narrower detector portion is more economical, and may also facilitate a compact device. In some such embodiments the absolute scale pattern may have a width less than 3.0 millimeters and still be used to provide a desirable range-to-resolution ratio in an economical absolute encoder configuration.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE PREFERRED EMBODIMENT

Figure 1:
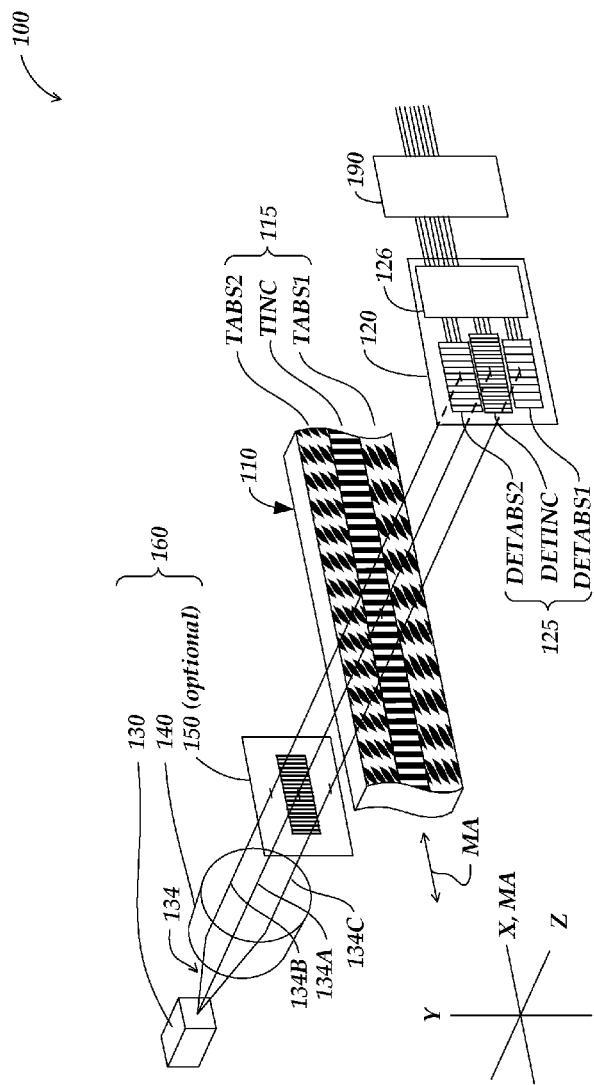
FIG. 1 is a partially schematic exploded diagram of a representative encoder configuration that uses a light source to illuminate a scale pattern and produce a corresponding spatially modulated light pattern on a detector.

FIG. 1 is a partially schematic exploded diagram illustrating an optical displacement encoder configuration 100, which is a representative encoder configuration that uses a light source to illuminate a scale pattern and produce a corresponding spatially modulated light pattern on a detector. The encoder configuration 100 is described in more detail in copending and commonly assigned U.S. patent application Ser. No. 12/273,400, filed Nov. 18, 2008, (hereinafter "the '400 Application") which is hereby incorporated by reference in its entirety. The illumination system or portion 160 used in the encoder configuration 100 has certain disadvantages, which are remedied by encoder configurations that use novel illumination configurations described in greater detail below. Various other aspects of the design and operation of the encoder configuration 100 are particularly desirable in some applications. These aspects of the design and operation may be retained in various advantageous combinations with the novel illumination configurations disclosed below with reference to FIGS. 2-8, and these aspects are therefore outlined here so that embodiments disclosed further below may be understood by analogy.

As shown in FIG. 1, the encoder configuration 100 includes a scale element 110, detector electronics 120 which is connected to signal generating and processing circuitry 190, and an illumination system or portion 160 comprising a light source 130 for emitting visible or invisible wavelengths of light, a lens 140, and an optional source grating 150. The light source 130 may also be connected to the signal generating and processing circuitry 190 by power and signal connections (not shown). As will be described in more detail below, the configuration of the scale tracks on the scale element 110 can be formed in a compact configuration and provide certain advantages.

In the embodiment shown in FIG. 1, the scale element 110 includes an absolute scale pattern 115 including three scale track patterns: an incremental track pattern TINC, a first absolute track pattern TABS1, and a second absolute track pattern TABS2, as described in more detail in the previously incorporated '400 Application. The track patterns TABS1 and TABS2 are referred to as absolute scale track patterns because they provide signals (e.g., a combination of signals) usable to determine an absolute position over an absolute measuring range determined by their configuration. FIG. 1 also shows orthogonal X, Y and Z directions, according to a convention used herein. The X and Y directions are parallel to the plane of the absolute scale pattern 115, with the X direction parallel to the intended measuring axis direction MA (e.g., perpendicular to elongated grating pattern elements that may be included in the incremental track pattern TINC). The Z direction is normal to the plane of the absolute scale pattern 115.

The detector electronics 120 includes a detector configuration 125 comprising three detector tracks DETINC, DETABS1 and DETABS2 arranged to receive light from the three scale track patterns TINC, TABS1 and TABS2, respectively. The detector electronics 120 may also include signal processing circuitry 126 (e.g., signal offset and/or gain adjustments, signal amplifying and combining circuits, etc.). In one embodiment, the detector electronics 120 may be fabricated as a single CMOS IC.

In operation, light 134 (e.g., primary light) emitted from the light source 130 may be partially or fully collimated by the lens 140, over a beam area sufficient to illuminate the three scale track patterns. FIG. 1 schematically shows three track-specific light paths 134A, 134B and 134C, of the light 134. Light path 134A is a representative central path including light that illuminates the scale track pattern TINC. When the scale track pattern TINC is illuminated, it outputs a track-specific spatially modulated light pattern to the detector track DETINC of the detector electronics 120. In some embodiments, for example those having a fine track wavelength of approximately 8-40 microns, the encoder configuration 100 may be configured according to known methods to produce a self image (e.g., a Talbot image or a Fresnel image) at the plane of the detector track DETINC. In some self-imaging configurations the light source 130 may be an LED. In some cases, depending on the characteristics of the light source 130, the source grating 150 may be required in order to condition the light 134 in a manner that makes it suitable for self-imaging. In such a case, the light surrounding the representative light path 134A passes through the grating structure of the source grating 150 to provide an array of spatially coherent illumination sources at the grating openings, which may be arranged with a pitch corresponding to the pitch or wavelength of the track pattern TINC (e.g., a pitch two times that of TINC), to illuminate the scale track pattern TINC according to known self-imaging illumination principles. FIG. 1 shows an embodiment of the source grating 150 that allows the representative light paths 134B and 134C to pass through a transparent substrate of the source grating 150, so that their intensity and degree of collimation, which contributes to the quality of the signals from the detector tracks DETABS1 and DETABS2, is not disrupted by the grating structure of the source grating 150. In other embodiments, the representative light paths 134B and 134C may also pass through a grating structure on the source grating 150, however, in certain embodiments this is not the optimum configuration.

Light paths 134B and 134C are representative paths including light that illuminates the scale track patterns TABS2 and TABS1, respectively. When the scale track patterns TABS2 and TABS1 are illuminated, they output track-specific spatially modulated light patterns (e.g., patterned light corresponding to their patterns) to the track-specific detector tracks DETABS2 and DETABS1, respectively, of the detector electronics 120. In various embodiments, the encoder configuration 100 may be configured such that the track patterns TABS2 and TABS1 produce a shadow image (e.g., a blurred or unblurred shadow image, depending on the degree of collimation provided by the lens 140) projected onto the detector tracks DETABS2 and DETABS1, respectively, as described in greater detail in the previously incorporated '400 Application. It will be appreciated that all of the spatially modulated light patterns move in tandem with the scale 110. In optical and electronic signal channels corresponding to each of the detector tracks DETINC, DETABS1 and DETABS2, individual photodetector areas are arranged to spatially filter their respective received spatially modulated light pattern to provide desirable position indicating signals (e.g., quadrature signals, or other periodic signals having a spatial phase relationship that is conducive to signal interpolation). In some embodiments, rather than individual photodetector areas, a spatial filter mask with individual apertures may mask relatively larger photodetectors to provide light receiving areas analogous to the individual photodetector areas illustrated, to provide a similar overall signal effect according to known techniques.

In various applications, the detector electronics 120 and illumination system 160 are mounted in a fixed relationship relative to one another, e.g., in a readhead or gauge housing (not shown), and are guided along the measuring axis relative to the scale 110 by a bearing system, according to known techniques. The scale may be attached to a moving stage, or a gauge spindle, or the like, in various applications. The configuration shown in FIG. 1 is a transmissive configuration. The scale pattern 115 comprises light blocking portions and light transmitting portions (e.g., fabricated on a transparent substrate using known thin-film patterning techniques, or the like) that output the spatially modulated light patterns to the detector tracks by transmission. It will be appreciated that similar components may be arranged in reflective embodiments, wherein the illumination system 160 and the detector electronics are arranged on the same side of the scale 110, and positioned for angled illumination and reflection if necessary, according to known techniques. In either transmissive or reflective scale patterns, the portions of the scale pattern that provide the light that is detected by the absolute detector tracks (e.g., DETABS1 or DETABS2), may be referred to as the signal producing portions of the scale pattern, and it will be understood that other portions of the scale pattern generally provide as little light as possible to the detector tracks and may be referred to as signal diminishing portions. It should be appreciated that the signal producing portions or the signal diminishing portions of the scale pattern may be patterned according to the teachings herein, in various embodiments. Stated another way, scale patterns which are "negatives" of each other may both produce useable signals, with the resulting signal variations also being approximately the "negative" of each other for a given reflective or transmissive arrangement. Thus, the scale patterns may be described in terms of "signal varying portions," and it will be understood that in various embodiments, the signal varying portions may comprise either the signal producing portions or the signal diminishing portions of the scale pattern.

As previously outlined, ideally, the spatially modulated light pattern that overlaps the photodetector should vary only as a function of the scale pattern displacement, which should be the sole determinant of the displacement signal. Stated another way, the spatially modulated light pattern should move in tandem with the displaced scale pattern, and otherwise its spatially modulated intensity variations should remain stable. However, it will be appreciated that illumination non-uniformity causes extraneous intensity variations that are superimposed upon those caused by the displaced scale pattern within the spatially modulated light pattern, such that the accuracy of the displacement signal is degraded. Conventionally, as exemplified by the illumination system 160, lenses and/or diffusers are positioned axially along an optical path in order to expand the beam of a light source and provide a uniform intensity distribution across the portion of the scale pattern that is to be imaged. However, the required length of an optical path including such elements (e.g., the divergence length between the light source and the lens, and the lens length) prevents the encoder configuration from being made more compact, particularly along the Z axis, and particularly as the area of the scale pattern that is illuminated is increased. As previously outlined, to provide robust operation, it is generally desirable to increase the area of the scale pattern that is illuminated to provide the spatially modulated light pattern to a practical maximum, such that any contamination that may be introduced on the scale pattern disrupts as little as possible of the detected spatially modulated light pattern.

In contrast to the encoder configuration 100, the embodiments disclosed below with reference to FIGS. 2 through 8 use novel illumination configuration including phosphors to provide uniform illumination intensity over a relatively broad illumination area of the scale pattern, while using a relatively small optical path length, particularly along the Z axis dimension.

Figure 2:
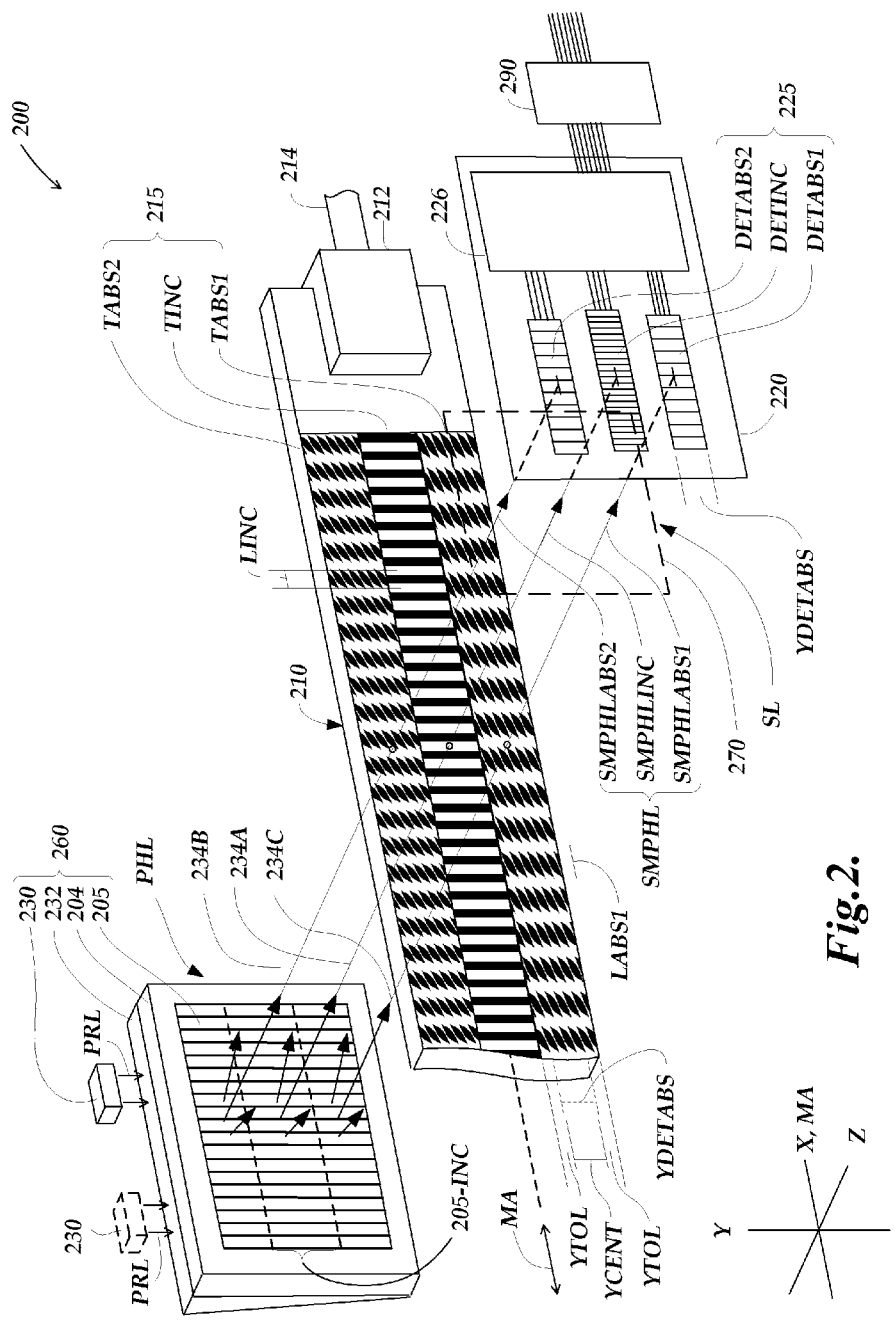
FIG. 2 is a partially schematic exploded diagram of a first embodiment of an encoder configuration utilizing a light source that includes a phosphor to provide illumination to a scale pattern and produce a corresponding spatially modulated light pattern on a detector in accordance with this invention.

FIG. 2 is a partially schematic exploded diagram of a first embodiment of an encoder configuration 200 utilizing a light source that includes a phosphor to provide illumination to a scale pattern that produces a corresponding spatially modulated light pattern on a detector in accordance with this invention. Except for the use of the phosphor to enhance the illumination uniformity and eliminate the requirement for an illumination lens, the components and operating principles of the encoder configuration 200 may be approximately similar to those of the encoder configuration 100 of FIG. 1, and may generally be understood by analogy. For example, 2XX series numbers in FIG. 2 that have the same "XX" suffix as 1XX series numbers in FIG. 1 may designate similar or identical elements, which may function similarly, except as otherwise described or implied below.

As shown in FIG. 2, the encoder configuration 200 includes a scale element 210, detector electronics 220 which is connected to signal generating and processing circuitry 290, and an illumination system or portion 260 comprising one or more primary light source(s) 230 (e.g., an LED) for generating visible or invisible wavelengths of light, an optical deflector and/or scattering element 232, a transparent substrate 204 with a phosphor layer 205 (alternatively referred to as a phosphor area 205). An optional wavelength filter 270 may also be included. In various embodiments, the optical deflector and/or scattering element 232 and the transparent substrate 204 may be merged and/or indistinguishable, and/or the phosphor layer 205 may be applied directly to a surface of the optical deflector and/or scattering element 232. The light sources 230 may be connected to the signal generating and processing circuitry 290 by power and signal connections (not shown). In various embodiments, the scale element 210 is positioned at a generally stable distance along the Z direction from the illumination system 260, and from the detector electronics 220 (in particular, the detector configuration 225) within an encoder housing or gauge housing or a readhead assembly (not shown), according to known techniques. In the embodiment shown in FIG. 2, the scale element 210 is shown to be supported at its end by a bracket 212 and a rod 214. In certain gauge applications (e.g., a spindle gauge) the rod 214 may be guided relative to the illumination portion 260 and detector configuration 225 (e.g., by bearings, not shown) and may project from the end of the gauge to contact a workpiece. The rod 214, the bracket 212, and the attached scale element 210 will then move relative to the gauge and follow the workpiece in order to measure its displacement. In some embodiments, spacers may be utilized to provide a desired gap or spacing between the illumination portion 260 and the detector configuration 225 along the Z direction, through which the scale element 210 moves along the direction of the measuring axis MA, as will be described in more detail below with respect to FIG. 3.

In the embodiment shown in FIG. 2, the scale element 210 includes an absolute scale pattern 215 including three scale track patterns similar to those of the scale pattern 115 of FIG. 1, an incremental track pattern TINC, and first and second absolute track patterns TABS1 and TABS2, respectively, which provide a combination of signals usable to determine an absolute position over an absolute measuring range determined by their configuration. Such tracks are described in detail in the previously incorporated '400 Application. The detector electronics 220 includes a detector configuration 225 comprising three detector tracks DETINC, DETABS1 and DETABS2 arranged to receive light from the three scale track patterns TINC, TABS1 and TABS2, respectively. The detector electronics 220 may also include signal processing circuitry 226 (e.g., signal offset and/or gain adjustments, signal amplifying and combining circuits, etc.). In one embodiment, the detector electronics 220 and/or the signal generating and processing circuitry 290 may be fabricated as a single CMOS IC.

Briefly outlining the operation of the encoder configuration 200, the primary light source(s) 230 generate and emit the primary light PRL which enters the optical deflector and/or scattering element 232 and is thereby distributed over a broad area through the transparent substrate 204 to the phosphor area 205, which has a light emitting area large enough to illuminate the three scale track patterns TINC, TABS1 and TABS2 with phosphor light PHL. For example, in some embodiments, the phosphor area 205 has a phosphor area dimension along the Y direction that is at least as large as the overall dimension of the scale pattern 215 along Y direction. The operation of the optical deflector and/or scattering element 232 and the phosphor area 205 are described in greater detail below. The three scale track patterns TINC, TABS1 and TABS2 output (e.g., transmit) the phosphor light PHL as track-specific spatially modulated phosphor light patterns SMPHLINC, SMPHLABS1, and SMPHLABS2 to the track-specific detector tracks DETINC, DETABS1 and DETABS2, respectively. It will be appreciated that in some embodiments, some of the primary light PRL may be transmitted through the phosphor area 205 and transmitted by the scale track patterns with the spatially modulated phosphor light patterns SMPHL. However, as outlined elsewhere herein, this may be undesirable in that the primary light PRL may be less uniform than the phosphor light PHL. Thus, some embodiments may include a wavelength filter 270 that removes the wavelengths corresponding to the primary light PRL from the signal light SL that reaches the detector tracks 225. Alternatively, in some embodiments, the detector tracks 225 are substantially insensitive to the wavelength range associated with the primary light PRL, and the wavelength filter is not needed in such embodiments. It will be appreciated that the illumination system 260 of the encoder configuration 200 provides illumination over a relatively broad area of the scale track patterns (e.g., corresponding to the phosphor area 205) while being very compact along the Z direction. The illumination system 260 overcomes intensity non-uniformities which are difficult to overcome in the primary light in this broad-area, yet compact-Z, illumination system arrangement by using the phosphor area 205 to output phosphor light PHL that has a more uniform intensity than the primary light PRL would have at a similar location along the optical path, due to effects and techniques described in greater detail below.

Examining the encoder configuration 200 further, FIG. 2 schematically shows three track-specific light paths 234A, 234B and 234C, of the phosphor light PHL. Light path 234A is represented by central ray in FIG. 2, and generally includes any light that both illuminates the scale track pattern TINC and reaches the detector track DETINC of the detector electronics 220. In particular, then the scale track pattern TINC is illuminated along the light path 234A, it outputs a track-specific spatially modulated light pattern to the track-specific detector track DETINC. In some embodiments, for example those having a fine track wavelength LINC of approximately 8-40 microns, the encoder configuration 200 may be configured to produce a self image (e.g., a Talbot image or a Fresnel image) at the plane of the detector track DETINC. In such fine track self-imaging configurations the phosphor area 205 may be patterned to provide a phosphor area source grating. That is, it may be patterned as fine stripes of phosphor material separated by spaces, at least in the phosphor area region 205-INC which produces phosphor light PHL that illuminates the scale track pattern TINC and subsequently reaches the detector track TINC, as represented in FIG. 2. Alternatively, a uniform phosphor may be masked to emit light through analogous fine slits. In either case, the phosphor area source grating provides an array of spatially coherent illumination sources, which may be arranged with a pitch approximately matching the pitch or wavelength of the track pattern TINC, to illuminate the scale track pattern TINC according to known self-imaging illumination principles.

Track-specific light paths 234B and 234C are represented by central rays in FIG. 2. Light path 234C generally includes any light that both illuminates the scale track pattern TABS1 and reaches the detector track DETABS1, and light path 234B generally includes any light that both illuminates the scale track pattern TABS2 and reaches the detector track DETABS2. When the scale track patterns TABS2 and TABS1 are illuminated, they output track-specific spatially modulated light patterns (e.g., patterned light corresponding to their patterns) to the track-specific detector tracks DETABS2 and DETABS1, respectively. In various embodiments, the encoder configuration 200 may be configured such that the track patterns TABS2 and TABS1 produce a shadow image (e.g., a blurred shadow image) on the detector tracks DETABS2 and DETABS1, as described in the previously incorporated '400 Application. In the embodiments shown in FIG. 2, the phosphor light PHL included in the light paths 234B and 234C originates from regions of the phosphor area 205 that are source grating structured. However, this is not significant to the signal generating operation of the corresponding tracks, and the regions of the phosphor area 205 that are outside of the region 205-INC may comprise uniform and/or unpatterned phosphor material, in various embodiments. Similarly, if self-imaging is not used to generate the fine track spatially modulated light pattern (e.g., if the fine track wavelength LINC is large enough to provide a detectable shadow image of the fine track TINC at the detector track DETINC), then the region 205-INC may also comprise uniform and/or unpatterned phosphor material. It will be appreciated that the sequence of the scale tracks along the Y direction in FIG. 2 is exemplary only, and not limiting. For example, in other embodiments, the absolute track patterns TABS1 and TABS2 may be arranged adjacent to one another with the fine track pattern TINC located to one side of them, provided that the detector tracks and source grating structure (if any) are arranged along the proper corresponding light paths according to the teachings outlined above.

In contrast to the light used to illuminate the scale tracks in the encoder configuration 100 shown in FIG. 1, in the encoder configuration 200 the phosphor light PHL that illuminates the scale may be quite diffuse. Thus, when shadow images provide the spatially modulated phosphor light patterns that are detected, the shadow images may be significantly blurred. The amount of blur will depend on the Z direction spacing or gap between phosphor area 205 and the scale pattern 215, and particularly on the Z direction spacing or gap between the scale pattern 215 and the detector configuration 225. It will be appreciated that FIG. 2 is an exploded view, where the Z direction spacing is greatly exaggerated. In various embodiments, the Z-direction spacings or gaps are selected to provide an amount of blur corresponding to desirable signal characteristics. It should be appreciated that some amount of blur may be advantageous, in that it may remove higher spatial frequencies from the spatially modulated phosphor light pattern that is detected, which may provide a more ideal sinusoidal displacement signal in some embodiments. One advantage of an absolute track pattern according to this invention, approximately as illustrated and/or as taught in the '400 Application, is that the spatial harmonic content in the resulting detector signal does not vary substantially at various Z direction spacings between the illumination system 260, the absolute scale pattern 215, and the detector configuration 225, and is thus a single absolute track pattern design can accommodate a variety of fine track techniques and adjustments without imposing additional design constraints.

As shown in FIG. 2, in various embodiments, the absolute track detector portion of FIG. 2 may be configured with individual photodetector areas that have a Y direction edge-to-edge dimension YDETABS along a Y direction that is perpendicular to a measuring axis direction, and these photodetector areas may be configured to spatially filter their received spatially modulated light pattern and output a plurality of respective position indicating signals that have respective spatial phases. The absolute track pattern may comprise geometrically congruent subtrack portions that extend along the measuring axis direction, and the geometrically congruent subtrack portions may be arranged such that if one of the geometrically congruent portions is translated along the Y direction by the dimension YDETABS, then the geometrically congruent portions will nominally coincide. The geometrically congruent subtrack portions may furthermore be configured such that they are separated along the Y direction by a dimension YCENT that is less than YDETABS, and the geometrically congruent subtrack portions may each have a Y direction dimension YTOL, such that the dimensional quantity [YCENT+2(YTOL)] is greater than YDETABS. Thus, the detector portion for sensing the absolute track may be narrower than the absolute track pattern along the Y direction, but because the ends of the photodetectors are each nominally located over geometrically congruent subtrack portions (to sense geometrically congruent light patterns), the detected signal is not sensitive to misalignment of the detector portion along the Y direction. It will be appreciated that a narrower detector portion is more economical, and may also facilitate a more compact device. These aspects of the encoder configuration 200, as well as alternative scale pattern track configurations that may be used, are described in greater detail in the previously incorporated '400 Application.

In some embodiments, the overall width of the scale pattern 215 may be 6.0 millimeters or significantly less (e.g., approximately 3.0 millimeters, or less, in some embodiments), the Y direction dimensions of the scale pattern tracks TINC, TABS1 and TABS2 may each be less than 2.0 millimeter or 1 or significantly less (e.g., 0.8 millimeters, in some embodiments), and the Y direction dimensions of the detector tracks DETINC, DETABS1 and DETABS2 may each be less than the scale pattern track dimension, (e.g., 0.5 millimeters when the scale pattern track dimensions are 0.8 millimeters). The Y direction dimensions YTOL may extend along the Y direction beyond the Y direction dimensions of the detector tracks DETINC, DETABS1 and DETABS2 by an amount that allows for both misalignment and to prevent blurred spatially modulated light from bleeding onto the detectors of an adjacent track (e.g., by 0.15-0.50 millimeters, or as otherwise required, in some embodiments). More generally, it is desirable in various embodiments to arrange the components so as to avoid "image crosstalk" (i.e., it is generally desirable that transmitted light from one track should not significantly reach a detector that is intended to detect light from a different track), as will be described in more detail below. The wavelength LABS2 of the absolute track pattern TABS2 may be L2=720 microns and the wavelength LABS1 of the absolute track pattern TABS1 may be L1=700 microns. The wavelength LINC of the fine track pattern TINC may be 20 microns. Using a signal processing technique that compares the phases of the LABS1 and LABS2 signals, this provides an absolute range of approximately 25.2 mm, and allows reasonable interpolation ratios to be used. Such compact dimensions are particularly advantageous in a number of applications (e.g., linear gauges and the like), both in relation to size and in relation to cost. It will be understood that the configuration and dimensions outlined in the example above, are exemplary only, and not limiting.

It will be appreciated that all of the spatially modulated light patterns move in tandem with the scale 210. In optical and electronic signal channels corresponding to each of the detector tracks DETINC, DETABS1 and DETABS2, individual photodetector areas, or masked areas on the photodetectors, are arranged to spatially filter their respective received spatially modulated light pattern to provide desirable position indicating signals (e.g., quadrature signals, or other periodic signals having a spatial phase relationship that is conducive to signal interpolation).

Examining the illumination system 260 further, as previously implied, the primary light PRL may comprise light concentrated in a first wavelength range, and may be emitted from light sources 230 (e.g., LED's, laser diodes) that have a relatively small light emitting area. The optical deflector and/or scattering element 232 is used to expand the primary light PRL from the relatively small light emitting area to cover a larger, relatively broad, light emitting area of the phosphor area 205) while traversing only a relatively short optical path length and, in particular, within a compact dimension along the Z direction (e.g., less than 5, 4 or 3 mm along the Z direction). In one embodiment the optical deflector and/or scattering element 232 may comprise a wedge shaped diffusing light guide panel analogous to that disclosed in U.S. Pat. No. 6,347,874, which is hereby incorporated herein by reference in its entirety. The optional wavelength filter 270 (if used) may generally be located at any location between the phosphor area 205 and the detector tracks of the detector portion 225. In some embodiments, it is located adjacent to the phosphor area 205 (to filter and output the phosphor light PHL), and may be part of the illumination system 260. In some embodiments, the phosphor area 205 may be located at the interface between the transparent substrate 204 the optical deflector and/or scattering element 232, where it is protected, and the optional wavelength filter 270 may be applied to the output surface of the transparent substrate 204. In various embodiments, the optical deflector and/or scattering element 232 and the transparent substrate 204 may be merged and/or indistinguishable, and/or the phosphor layer 205 may be applied directly to a surface of the optical deflector and/or scattering element 232. As previously indicated, in some embodiments the optical deflector and/or scattering element 232 and the transparent substrate 204 may be merged and/or indistinguishable, and/or the phosphor layer 205 may be applied directly to a surface of the optical deflector and/or scattering element 232. In other embodiments an illumination system comprising the light sources 230, the optical deflector and/or scattering element 232, and the phosphor area 205 may included interference filters (e.g., the filter 270) and/or reflectors, and/or may otherwise be arranged in a manner analogous to configurations disclosed in U.S. Pat. No. 7,357,554, which is hereby incorporated herein by reference in its entirety.

As previously outlined, it is a desirable feature of an encoder configuration according to this invention that the illumination system (e.g., the illumination system 260) provides phosphor light PHL that illuminates the scale track patterns with better intensity uniformity than would otherwise be provided by the primary light PRL in the absence of the phosphor area 205. For example, in concrete terms, the illumination system provides phosphor light PHL that illuminates the scale track patterns with better intensity uniformity than is provided by the primary light PRL proximate to the phosphor area 205. One advantage of using a phosphor area in a configuration according to this invention (e.g., the phosphor area 205) is that the primary light PRL is scattered in the phosphor medium, improving its intensity uniformity within the phosphor area. Furthermore, the phosphor light PHL emitted by the phosphor is emitted omni-directionally by the phosphor molecules, such that the phosphor light primary light PRL is a spatially averaged diffuse light, improving its intensity uniformity beyond that of the primary light PRL, particularly at a distance from the phosphor area 205 (e.g., at the location of the scale patterns 215).

A further advantage of the phosphor area (e.g., the phosphor area 205) is provided when the phosphor area is configured to include a "saturation" intensity level and the primary light PRL is distributed to the phosphor area with a primary light intensity that exceeds the saturation intensity level proximate to the phosphor area, for at least a portion of the phosphor area. By a saturation intensity level, we mean that above the saturation intensity level the ratio of phosphor light intensity increase to primary light intensity increase decreases significantly relative to that ratio below the saturation intensity level. This non-linear phosphor area response may arise from one or more fundamental mechanisms, including known concentration quenching and/or luminescence saturation processes such as ground state depletion and energy transfer between excited phosphor ions, additional quenching pathway energy transfer, and/or a slow radiative relaxation rate of the phosphor material (e.g., slow relative to the excitation pulse of primary light), for example.

Due to the aforementioned nonlinear response in the phosphor area, intensity peaks in the primary light PRL intensity distribution that exceed the saturation intensity level at the phosphor area are relatively reduced or eliminated in the resulting phosphor light PHL intensity distribution that is output from the phosphor area in the wavelength range of the phosphor light PHL. As a result the phosphor light PHL intensity uniformity may be significantly more uniform than the level of primary light PRL intensity uniformity proximate to the phosphor area. In various embodiments, it may be desirable if a majority or all of the phosphor area is illuminated with a primary light intensity that exceeds its saturation intensity level. It will be appreciated that in order to best exploit this effect to achieve uniform intensity in the phosphor light PHL, it is advantageous to make the density and thickness of the light emitting regions of the phosphor area material substantially uniform, or as uniform as possible.

The uniform diffuse light from the phosphor area 205 works well in cooperation with the scale and detection concepts outlined above. The foregoing features, separately and in combination, allow for a relatively small primary light emitting area to be expanded to a relatively large phosphor light illumination area in relatively short illumination path length, and still provide a relatively uniform illumination intensity (the phosphor light illumination intensity) to the scale track pattern over the relatively large area, to enhance robustness and accuracy in a compact configuration. In some embodiments, the phosphor light PHL intensity may vary less than 10%, 5% or even 1% proximate to the portions of the scale pattern that provide the detected portions of spatially modulated light pattern.

Another advantage of a phosphor area is that phosphors can respond to very short primary light PRL pulses (e.g., pulse durations of 5 microseconds or less, or 1 microsecond or less, in some embodiments) and output phosphor light PHL very quickly (e.g., on the order of less than a microsecond to hundreds of microseconds, depending on the phosphor composition and the primary light pulse duration), and can be fairly energy-efficient. Therefore, they are compatible with pulsed low power (e.g., battery-powered) optical encoder configurations (e.g., absolute encoder gauge operations), where each pulse may exceed the saturation level over some or all of the phosphor area, if desired, while maintaining a low average power level. General design considerations for the use of phosphors are described in U.S. Patent Publication Nos. 2008/0231911, and 2009/0101930, each of which are hereby incorporated by reference herein in their entireties.

Figure 3:
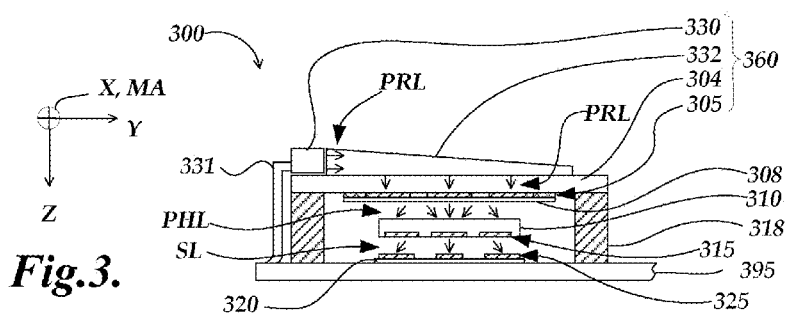
FIG. 3 is a diagram of a cross-sectional end view of a second embodiment of an encoder configuration utilizing a light source that includes a phosphor to provide illumination to a scale pattern.
Figure 4A:
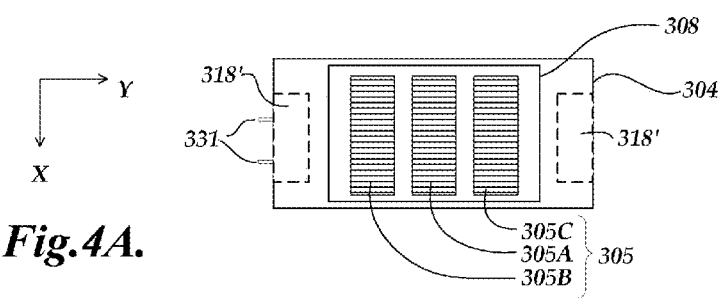
FIGS. 4A-4C are diagrams of top and bottom views of components at different layers within the encoder configuration of FIG. 3.
Figure 4B:
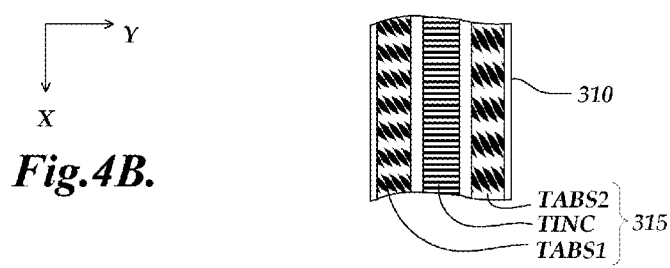
Figure 4C:
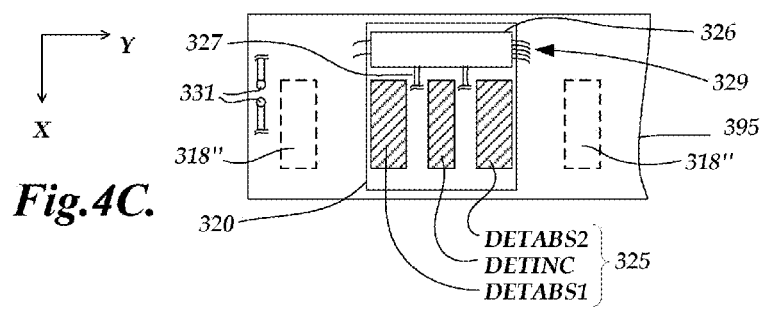

FIG. 3 is a diagram of a cross-sectional end view of a second embodiment of an encoder configuration 300 utilizing a light source that includes a phosphor area to provide illumination to a scale pattern, and FIGS. 4A-4C are diagrams of top and bottom views of selected components at different layers within the encoder configuration 300 of FIG. 3, with alignment along the Y direction approximately maintained throughout all these figures. In one embodiment, the encoder configuration 300 may be similar to the encoder configuration 200 of FIG. 2, and elements having 3XX reference numbers may generally be analogous to elements having 2XX reference numbers in FIG. 2, and may generally be similarly understood and configured in an analogous manner, unless otherwise indicated by description or context. As shown in FIG. 3, the encoder configuration 300 includes a scale member 310 including a scale pattern 315, a circuit assembly 395 (e.g., a printed circuit board and associated signal processing circuitry) including a detector electronics 320, and an illumination system or portion 360, which in this embodiment comprises one or more primary light source(s) 330 (e.g., an LED) for generating visible or invisible wavelengths of light, an optical deflector element 332, a transparent substrate 304 with a phosphor layer or area 305.

The light source(s) 330 may be connected to signal generating and processing circuitry of the circuit assembly 395 by power and signal connections 331. In various embodiments, the scale element 310 is positioned and guided at a generally stable distance along the Z direction from the illumination system 360, and from the detector electronics 320 (in particular, the detector configuration 325) within an encoder housing or gauge housing according to known techniques. In the embodiment shown in FIG. 3, spacers 318 may be utilized to provide a desired gap or spacing between the illumination portion 360 and the detector configuration 325 along the Z direction, through which the scale element 310 moves along the direction of the measuring axis MA.

Briefly outlining the operation of the encoder configuration 300, the primary light source(s) 330 generate and emit the primary light PRL which enters the optical deflector element 332 and is thereby distributed over a broad area through the transparent substrate 304 to the phosphor area 305, which has a light emitting area large enough to illuminate the scale track patterns included in the scale pattern 315 with phosphor light PHL. The primary light PRL may have a first wavelength range, and the phosphor light PHL may have a second wavelength range different than the first wavelength range, as previously outlined. The scale pattern 315 outputs (e.g., transmits) the phosphor light PHL as a spatially modulated phosphor light pattern to the detector tracks of the detector configuration 325, according to principles previously outlined with reference to FIG. 2. In some embodiments, the encoder configuration may include a wavelength filter (not shown) located at a convenient location along the optical path between the phosphor area 305 and the detector configuration 325 to remove the wavelengths corresponding to the primary light PRL from the signal light SL that reaches the detector configuration 325, according to previously outlined principles. Alternatively, in some embodiments, the detectors of the detector configuration 325 are substantially insensitive to the wavelength range associated with the primary light PRL, and the wavelength filter is not needed in such embodiments. In any case, the optical and electronic signal channels corresponding to each of the detector tracks of the detector configuration 325, are arranged to spatially filter their respective received spatially modulated light pattern to provide desirable position indicating signals (e.g., quadrature signals, or other periodic signals having a spatial phase relationship that is conducive to signal interpolation), according to previously described principles.

FIG. 4A is a diagram illustrating a bottom view of elements associated with the illumination system 360. FIG. 4A shows the footprint of joining areas 318' where the transparent substrate 304 may be fastened to the spacers 318 (shown in FIG. 3), to establish a desired gap between the various elements of the encoder configuration 300. As shown in FIG. 4A, the phosphor area 305 may include track-specific phosphor areas 305A, 305B and 305C. However, in other embodiments these track-specific areas may be merged and or indistinguishable. In one embodiment the phosphor area 305A may be formed as an incremental illuminating portion which is source grating structured in order to support self-imaging of the track TINC, and the other phosphor areas 305C and 305B may or may not be source grating structured, depending on whether phosphor light PHL from them reaches the incremental track of the scale and the incremental detector array, all according to principles previously outlined with reference to FIG. 2. In one embodiment, a cover 308 (e.g., a material sheet or an encapsulant) covers and surrounds the phosphor area 305 for environmental and/or abrasion protection. In one embodiment that cover 308 may include a wavelength filter that blocks the primary light PRL. More generally, in various embodiments the illumination system 360 may have alternative configurations including any compatible combination of the various alternative illumination system features previously outlined with reference to FIG. 2. As previously outlined, it is generally advantageous to make the phosphor area 305 be as uniform as possible. It is also advantageous when the phosphor area 305 is configured to include a "saturation" intensity level and the primary light PRL is distributed to the phosphor area with a primary light intensity that exceeds the saturation intensity level proximate to the phosphor area 305, for at least a portion of the phosphor area 305, according to previously outlined principles. Both of the aforementioned factors tend to improve the uniformity of the phosphor light PHL that illuminates the scale pattern 315 and provides the signal light SL, which generally improves the potentially accuracy of the encoder configuration 300. The encoder configuration 300 provides phosphor light PHL that has better intensity uniformity proximate to the scale pattern 315 than the primary light intensity uniformity proximate to the phosphor area 305. In various embodiments, the phosphor light intensity may vary less than 10%, 5% or even 1% proximate to the portions of the scale pattern 315 that provide the detected portions of the spatially modulated light pattern included in the signal light SL.

FIG. 4B is a diagram of a bottom view of the scale member 310. As shown in FIG. 4B, the scale member 310 includes the scale pattern 315, which may include an incremental track TINC and two absolute tracks TABS1 and TABS2. In one embodiment, the scale pattern 315 may be similar to the scale pattern 215 of FIG. 2.

FIG. 4C is a diagram of a top view of the circuit assembly 395. As shown in FIG. 4C, the circuit assembly 395 (e.g., a printed circuit board) includes the detector electronics 320 (e.g., an integrated circuit as previously described with reference to the detector electronic 120 and/or 220). The detector electronics 320 may comprise signal processing circuitry 326 (e.g., signal offset and/or gain adjustments, signal amplifying and combining circuits, etc.) and the detector configuration 325, which may comprise three detector tracks DETINC, DETABS1 and DETABS2 arranged to receive light from the three scale track patterns TINC, TABS1 and TABS2, respectively, and provide desirable signals, all according to previously described principles. All of the foregoing elements may be interconnected by circuit connections 327 and 329 (e.g., circuit traces and wirebonds, which are represented in a symbolic manner). The circuit assembly 395 may include additional signal processing and/or interface circuitry (not shown) as needed to support the operation of the light sources and a host system, display, or the like. FIG. 4C also shows the footprint of joining areas 318" where the circuit assembly 395 may be fastened to the spacers 318 (shown in FIG. 3), to establish a desired gap between the various elements of the encoder configuration 300, as outlined above.

As previously indicated, it is desirable in various embodiments to arrange the various elements shown and described so as to avoid "image crosstalk" between the various tracks (i.e., it is generally desirable that a significant amount of light from one track should not reach a detector that is intended to detect light from a different track). It is furthermore desirable to set the spacings along the optical path to avoid excessive blur in the spatially modulated phosphor light that provides the signal light SL that is detected by the detector configuration 325. It will be understood that various dimensions in FIGS. 3 and 4A-4C are necessarily exaggerated for purposes of illustration, and that desirable configurations and/or spacings may be established by analysis or experiment based on the principles outlined herein. Thus, it will be understood that the configurations illustrated herein are exemplary only, and not limiting.

Figure 5:
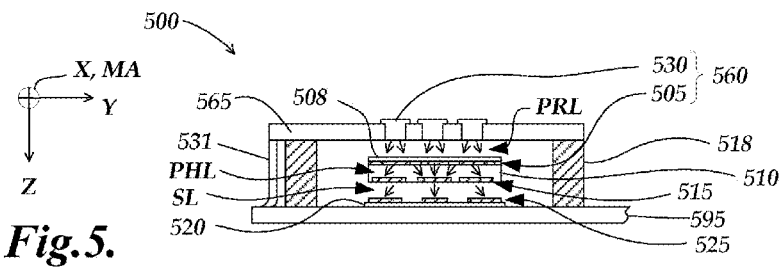
FIG. 5 is a diagram of a cross-sectional end view of a third embodiment of an encoder configuration utilizing a light source that includes a phosphor to provide illumination to a scale pattern.

FIG. 5 is a diagram of a cross-sectional end view of a third embodiment of an encoder configuration 500 utilizing a light source that includes a phosphor area to provide illumination of a scale pattern, and FIGS. 6A-6D are diagrams of top and bottom views of selected components at different layers within the encoder configuration of FIG. 5, with alignment along the Y direction approximately maintained throughout all these figures. In one embodiment, certain of the components of the encoder configuration 500 may be similar to their counterparts in the encoder configuration 300 of FIGS. 3 and 4A-4C, and elements having 5XX reference numbers may generally be analogous to elements having 3XX reference numbers in FIGS. 3 and 4A-4C, and may generally be similarly understood and configured in an analogous manner, unless otherwise indicated by description or context. As shown in FIG. 5, the encoder configuration 500 includes a scale member 510 including a scale pattern 515, a circuit assembly 595 (e.g., a printed circuit board and associated signal processing circuitry) including a detector electronics 520, and an illumination system or portion 560, which in this embodiment comprises a primary light source assembly 565 including one or more primary light source(s) 530 (e.g., an LED) for generating visible or invisible wavelengths of light, and a phosphor area 505. The light source(s) 530 may be connected to signal generating and processing circuitry of the circuit assembly 595 by power and signal connections 531. In contrast to previously described illumination systems, in the present embodiment the phosphor area 505 is located on a surface 510A of the scale member 510, as described in greater detail below. The scale element 510 may be guided at a generally stable distance along the Z direction from the detector electronics 520 (in particular, the detector configuration 525) within an encoder housing or gauge housing according to known techniques. Spacers 518 may provide a desired gap between the primary light source assembly 565 and the detector configuration 525 along the Z direction, through which the scale element 510 moves along the direction of the measuring axis MA.

Briefly outlining the operation of the encoder configuration 500, the primary light source(s) 530 generate and emit the primary light PRL over a broad area to illuminate through the intervening gap to the phosphor area 505, which extends along the measuring axis direction of the scale surface 510A. The phosphor area 505 has a light emitting area large enough to illuminate the scale track patterns included in the scale pattern 515 through the transparent scale member 510 with the phosphor light PHL. The primary light PRL may have a first wavelength range, and the phosphor light PHL may have a second wavelength range, as previously outlined. The scale pattern 515 outputs (e.g., transmits) the phosphor light PHL as a spatially modulated phosphor light pattern to the detector tracks of the detector configuration 525, according to principles previously outlined with reference to FIGS. 2 and 3. In some embodiments, the encoder configuration may include a wavelength filter (not shown) located at a convenient location along the optical path between the phosphor area 505 and the detector configuration 525 to remove the wavelengths corresponding to the primary light PRL from the signal light SL that reaches the detector configuration 525, according to previously outlined principles. Alternatively, in some embodiments, the detectors of the detector configuration 525 are substantially insensitive to the wavelength range associated with the primary light PRL, and the wavelength filter is not needed in such embodiments. The optical and electronic signal channels corresponding to each of the detector tracks of the detector configuration 525, are arranged to spatially filter their respective received spatially modulated light pattern to provide desirable position indicating signals (e.g., quadrature signals, or other periodic signals having a spatial phase relationship that is conducive to signal interpolation), according to previously described principles.

Figure 6A:
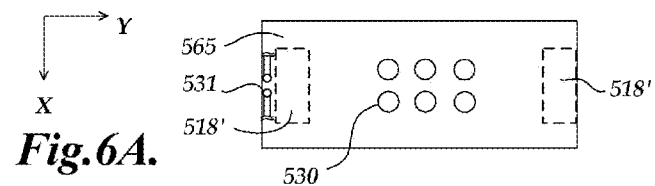
FIGS. 6A-6D are diagrams of top and bottom views of components at different layers within the encoder configuration of FIG. 5.

FIG. 6A is a diagram illustrating a bottom view of elements associated with the primary light source assembly 565, which may be a printed circuit board. FIG. 6A shows the footprint of joining areas 518' where the primary light source assembly 565 may be fastened to the spacers 518 (shown in FIG. 5), to establish a desired gap between the various elements of the encoder configuration 500. The primary light source(s) 530 may be arranged in any desired pattern provided that the phosphor area 505 is illuminated according to previously outlined principles. More generally, in various embodiments the primary light source assembly 565 may have alternative configurations including any compatible combination of functionally similar illumination system features previously outlined with reference to FIG. 2 or 3, or the like. For example, in one alternative embodiment the primary light source assembly 565 may include components arranged approximately as the components 330 and 332 are arranged in the encoder configuration 300 (shown in FIG. 3).

Figure 6B:
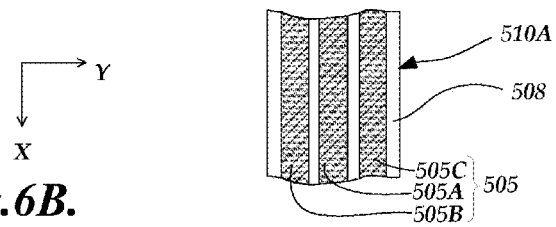

FIG. 6B is a diagram of the upper surface 510A of the scale member 510, including the phosphor area 505. In this embodiment, the phosphor area 505 extends along the measuring axis direction of the scale member 510 over a length commensurate with the scale pattern 515, and different parts of the phosphor area 505 are illuminated and emit light, depending on which part of the scale member 510 is located adjacent to the primary light PRL and the detector configuration 525. As shown in FIG. 6B, the phosphor area 505 may include track-specific phosphor areas 505A, 505B and 505C. However, in other embodiments these track-specific areas may be merged and or indistinguishable. In one embodiment the phosphor area 505A may be formed as an incremental illuminating portion which is source grating structured in order to support self-imaging of the track TINC, and the other phosphor areas 505C and 505B may or may not be source grating structured, depending on whether phosphor light PHL from them reaches the incremental track of the scale and the incremental detector array, all according to principles previously outlined with reference to FIG. 2. In one embodiment, a cover 508 (e.g., a material sheet or an encapsulant) covers and surrounds the phosphor area 505 for environmental and/or abrasion protection. As previously outlined, it is generally advantageous to make the phosphor area 505 be as uniform as possible. It is also advantageous when the phosphor area 505 is configured to include a "saturation" intensity level and the primary light PRL is distributed to the phosphor area with a primary light intensity that exceeds the saturation intensity level proximate to the phosphor area 505, for at least a portion of the phosphor area 505, according to previously outlined principles. Both of the aforementioned factors tend to improve the uniformity of the phosphor light PHL that illuminates the scale pattern 515 and provides the signal light SL, which generally improves the potentially accuracy of the encoder configuration 500.

Figure 6C:
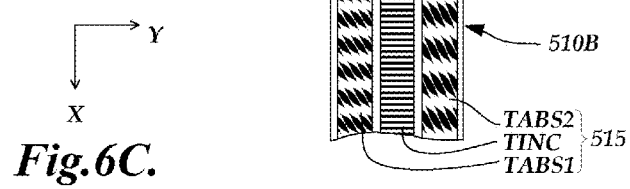

FIG. 6C is a diagram of a bottom view of the scale member 510. As shown in FIG. 6C, the scale member 510 includes the scale pattern 515, which may include an incremental track TINC and two absolute tracks TABS1 and TABS2. In one embodiment, the scale pattern 515 may be similar to the scale pattern 215 of FIG. 2.

Figure 6D:
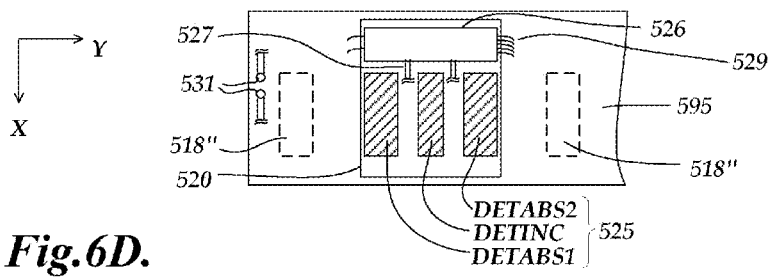

FIG. 6D is a diagram of a top view of the circuit assembly 595, and associated elements. The elements of FIG. 6D are analogous to counterparts shown in FIG. 4C, and may be similarly understood.

As previously indicated, it is desirable in various embodiments to arrange the various elements to avoid "image crosstalk" between the various tracks. It is furthermore desirable to set the spacings along the optical path to avoid excessive blur in the spatially modulated phosphor light that provides the signal light SL that is detected by the detector configuration 525. It will be understood that various dimensions in FIGS. 5 and 6A-6D are necessarily exaggerated for purposes of illustration, and that desirable configurations and/or spacings may be established by analysis or experiment based on the principles outlined herein. Thus, it will be understood that the configurations illustrated herein are exemplary only, and not limiting.

Figure 7:
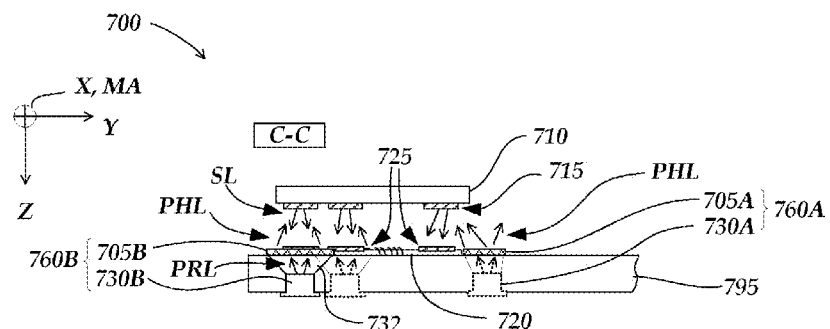
FIG. 7 is a diagram of a cross-sectional end view of a fourth embodiment of an encoder configuration utilizing a light source that includes phosphor to provide illumination to a scale pattern.
Figure 8A:
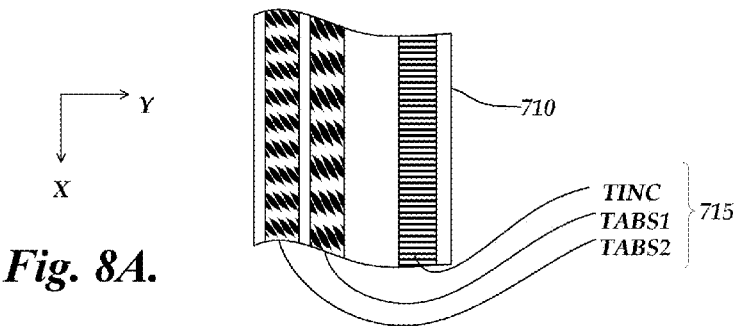
FIGS. 8A and 8B are diagrams of top and bottom views of components at different layers within the encoder configuration of FIG. 7.
Figure 8B:
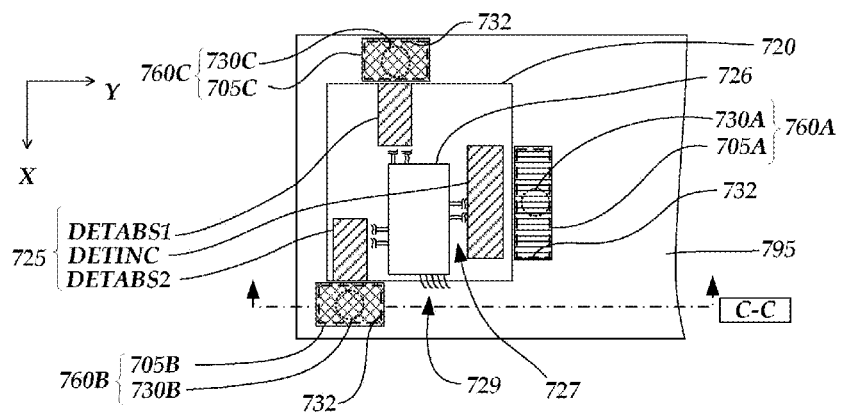

FIG. 7 is a diagram of a cross-sectional end view of a fourth embodiment of an encoder configuration 700 utilizing a light source that includes phosphor areas to provide illumination to a scale pattern, and FIGS. 8A and 8B are diagrams of top and bottom views of selected components at different layers within the encoder configuration of FIG. 7, with alignment along the Y direction approximately maintained throughout all these figures. As will be described in more detail below, the encoder configuration 700 illustrates a reflective-type configuration. Despite this difference from previous embodiments, certain of the components of the encoder configuration 700 may be similar to their counterparts in the encoder configuration 300 of FIGS. 3 and 4A-4C, and elements having 7XX reference numbers may generally be analogous to elements having 3XX reference numbers in FIGS. 3 and 4A-4C, and may generally be similarly understood and configured in an analogous manner, unless otherwise indicated by description or context.

As shown in FIG. 7, the encoder configuration 700 includes a scale member 710 including a scale pattern 715, a circuit assembly 795 (e.g., a printed circuit board and associated signal processing circuitry) including a detector electronics 720 and an illumination system or portion 760. In this embodiment the illumination system 760 comprises three track-specific illumination systems, 760A, 760B, and 760C, as described in greater detail below. Each of the track-specific illumination systems comprises a primary light source 730A, 730B, or 730C (e.g., an LED) for generating visible or invisible wavelengths of light, and a corresponding phosphor area 705A, 705B or 705C, respectively. The phosphor areas 705A, 705B or 705C may be fabricated on one or more transparent substrates that are fastened to the circuit assembly 795. The light sources 730 may be connected to signal generating and processing circuitry of the circuit assembly 795 by power and signal connections (not shown). The scale element 710 may be guided at a generally stable distance along the Z direction from the circuit assembly 795 (in particular, the illumination systems 730 and detector configuration 725) within an encoder housing or gauge housing according to known techniques.

Briefly outlining the operation of the encoder configuration 700, each primary light source 730 generates and emits the primary light PRL to cover the relatively broad area of their corresponding phosphor area 705. For example, the primary light PRL diverges very strongly from a relatively small emitting area of the primary light source 730 to illuminate its corresponding phosphor area 705, with or without the aid of a miniature lens (not shown). In the embodiment shown in FIGS. 7, 8A and 8B, the primary light source 730 may be mounted into a circuit board of the circuit assembly 795, which may include a pocket 732 (shown in dashed outline in FIGS. 8A and 8B) between the primary light source and the phosphor area 705 to allow a clearance path for the primary light PRL. In one embodiment, the pocket 732 may include (e.g., be filled with) a scattering or diffusing element (e.g., a molded scattering or diffusing element or a scattering or diffusing medium) to aid the divergence of the primary light PRL, if needed. In other embodiments, a plurality of primary sources 730 (e.g., a plurality of primary light sources 730A) may illuminate a single one of the track-specific phosphor areas 705 (e.g., the phosphor area 705A), to reduce the amount of divergence that is required for the primary light PRL.

Each phosphor area 705 has a light emitting area large enough to illuminate its corresponding nearby scale track pattern, which is included in the scale pattern 715 on the transparent scale member 710, with phosphor light PHL. Because the phosphor light PHL is generally diffuse, each illumination system 705 includes light that reaches the corresponding nearby scale track at an angle and then reflects at an angle to reach the corresponding nearby detector track of the detector configuration 725. The primary light PRL may have a first wavelength range, and the phosphor light PHL may have a second wavelength range, as previously outlined. The scale pattern 715 includes reflective pattern portions that output (reflect) the phosphor light PHL as a spatially modulated phosphor light pattern to the detector tracks of the detector configuration 725, according to principles previously outlined with reference to FIGS. 1-3. In some embodiments, the encoder configuration 700 may include a wavelength filter (not shown) located to cover the detector tracks of the detector configuration 725, to remove the wavelengths corresponding to the primary light PRL from the signal light SL that reaches the detector configuration 725, according to previously outlined principles. Alternatively, in some embodiments, the detectors of the detector configuration 725 are substantially insensitive to the wavelength range associated with the primary light PRL, and the wavelength filter is not needed in such embodiments. The optical and electronic signal channels corresponding to each of the detector tracks DETINC, DETABS1 and DETABS2 of the detector configuration 725, are arranged to spatially filter their respective received spatially modulated light pattern to provide desirable position indicating signals (e.g., quadrature signals, or other periodic signals having a spatial phase relationship that is conducive to signal interpolation), according to previously described principles.

FIG. 8A is a diagram of a bottom view of the scale member 710. As shown in FIG. 8A, the scale member 710 includes the scale pattern 715, which may include an incremental track TINC and two absolute tracks TABS1 and TABS2. In one embodiment, except for their location relative to one another on the scale member 710, the individual scale tracks TINC, TABS1 and TABS2 may be similar to those previously described with reference to FIG. 2. The scale tracks TABS1, TABS2 and TINC may comprise high reflectance portions (e.g., bright chrome) that output the spatially modulated light pattern to the detector tracks DETABS1, DETABS2 and DETINC, respectively, by reflection, as well as having low reflectance portions or transmissive portions that absorb the phosphor light PHL or transmit it away from the detector tracks.

FIG. 8B is a diagram of a top view of the circuit assembly 795, and associated elements. The elements 720, 725, 726, 727, and 729 of FIG. 8B are analogous to counterparts shown in FIG. 4C, and may be similarly understood. The elements and operation illumination systems 760A-760C may be understood based on previous description. In one embodiment the phosphor area 705A may be formed as an incremental illuminating portion which is source grating structured in order to support self-imaging of the track TINC, and the other phosphor areas 705C and 705B may or may not be source grating structured, depending on whether phosphor light PHL from them reaches the incremental track TINC of the scale and the incremental detector array DETINC, all according to principles previously outlined with reference to FIG. 2. In one embodiment, a cover (e.g., a material sheet or an encapsulant, not shown) may cover or surround each the phosphor areas 705A-705C for environmental and/or abrasion protection. As previously outlined, it is generally advantageous to make each of the phosphor areas 705A-705C as uniform as possible. It is also advantageous when each of the phosphor areas 705A-705C is configured to include a "saturation" intensity level and the primary light PRL is distributed to the phosphor area with a primary light intensity that exceeds the saturation intensity level proximate to the phosphor area, according to previously outlined principles. Both of the aforementioned factors tend to improve the uniformity of the phosphor light PHL that illuminates the scale pattern 715 and provides the signal light SL, which generally improves the potentially accuracy of the encoder configuration 700.

Regarding the overall arrangement of the tracks of the encoder configuration 700, as previously indicated, it is desirable in various embodiments to arrange the various elements to avoid "image crosstalk" between the various tracks. It will be appreciated that the illumination system 760A illuminates the scale track TINC with phosphor light that is incident on, and reflects from, the scale track TINC with a significant component of travel along the Y direction (that is, perpendicular to the measuring axis direction MA and parallel to the grating bars of the scale track TINC. Therefore, the scale track TINC and the detector track DETINC are separated along the Y direction from the other detector tracks by a distance that prevents them from receiving a significant amount of the light reflected from the scale track TINC along the Y direction. Of course this also prevents light from the scale tracks TABS1 and TABS2 from reaching the detector DETINC. Illuminating the scale track TINC along the Y direction (e.g., approximately as shown in FIGS. 7 and 8A-8B) may allow relatively uniform illumination to be provided along the illuminated length of the detector track DETINC, despite the reflective configuration and the angled illumination and reflection. In one embodiment, the phosphor area 705A may be source grating structured, and may be fabricated on a transparent substrate. The edge of the transparent substrate may be fabricated perpendicular to the bars of the source grating structure. Similarly the adjacent edge of the detector electronics 720 may be fabricated perpendicular to the elongated individual sensing areas of the detector track DETINC (shown in FIG. 2, for example). The adjacent edges of the transparent substrate of the phosphor area 705A and the detector electronics 720 may then be assembled to abut one another, which aligns the source grating structure to detector structure so that both may be aligned to the grating structure of the scale track TINC, in order to optimize self-imaging of the scale track TINC on the detector track DETINC. Since the signals from the detector track DETINC provide the highest resolution and accuracy in the encoder configuration 700, these features may be advantageous, either separately or in combination.

In contrast, in the embodiment shown in FIGS. 7 and 8A-8B, the illumination systems 760C and 760B illuminate the scale tracks TABS1 and TABS2, respectively, with phosphor light that is incident on, and reflects from, the scale tracks with a primary component of travel along the X direction (and only a relatively small component of travel along the Y direction). Therefore, in order to prevent image crosstalk it is sufficient to separate the illumination system 760C and the detector track DETABS1 (which are associated with the scale track TABS1) primarily along the X direction from the illumination system 760B and the detector track DETABS2 (which are associated with the scale track TABS2), e.g., as shown in FIG. 8A-8B. It will be understood that various dimensions in FIGS. 7 and 8A-8B are necessarily altered or exaggerated for purposes of illustration, and that desirable configurations and/or spacings may be established by analysis or experiment based on the principles outlined herein.

The encoder configuration 700 shown in FIGS. 7 and 8A-8B is suitable for simultaneous operation of all signal channels, which may be advantageous in applications that measure high speed motion. However, there are a number of applications in which the signals from the various signal channels (e.g., signals from the detector tracks DETINC, DETABS1 and DETABS2) may be obtained sequentially without detrimentally affecting the measurement accuracy. In such applications the illumination systems 760A, 760B and 760C may be operated at different times, in which case image crosstalk may be prevented by using exclusive circuit timing for activating the various illumination systems (e.g., to provide individual light pulses) and for acquiring the signals from the various detector tracks. Thus, in embodiments that activate individual illumination systems and acquire signals sequentially, the configuration of illumination systems, scale tracks, and detector tracks need not consider image crosstalk, and may therefore be made considerably more compact than the configurations illustrated and described above. Thus, it will be understood that the configurations illustrated herein are exemplary only, and not limiting.

While the preferred embodiment of the invention has been illustrated and described, numerous variations in the illustrated and described arrangements of features and sequences of operations will be apparent to one skilled in the art based on this disclosure. Thus, it will be appreciated that various changes can be made therein without departing from the spirit and scope of the invention.

The invention claimed is:

1. An encoder configuration for use in a position sensing device usable to measure a relative position between two elements along a measuring axis direction, the encoder configuration comprising:
at least one illumination system including:
a light generator that generates a primary light emitted from a primary light emitting area, and
a phosphor area arranged to receive the primary light and, in response, to output phosphor light from a phosphor light emitting area;
a scale element including a scale pattern extending along the measuring axis direction, the scale pattern arranged to be illuminated by phosphor light from the phosphor light emitting area and to output a spatially modulated phosphor light pattern along a light path; and
a detector electronics comprising a detector portion arranged in a fixed relationship relative to the light generator, and arranged to receive the spatially modulated phosphor light pattern along the light path,
wherein the encoder configuration is configured such that:
the primary light is distributed to the phosphor area with a first level of primary light intensity uniformity proximate to the phosphor area and the phosphor area outputs the phosphor light with a second level of phosphor light intensity uniformity; and
the second level of phosphor light intensity uniformity is more uniform than the first level of primary light intensity uniformity proximate to the phosphor area.

2. The encoder configuration of claim 1, wherein:
the phosphor area is configured to include a saturation intensity level wherein for primary light intensities above the saturation intensity level a ratio of phosphor light intensity increase to primary light intensity increase decreases relative to that ratio below the saturation intensity level; and
the primary light is distributed to the phosphor area with a primary light intensity that exceeds the saturation intensity level proximate to the phosphor area, for at least a portion of the phosphor area.

3. The encoder configuration of claim 2, wherein the primary light is distributed to the phosphor area with a primary light intensity that exceeds the saturation intensity level proximate to the phosphor area, for at least the phosphor light emitting area.

4. The encoder configuration of claim 1, wherein the light generator generates the primary light as a primary light pulse having a primary light pulse duration and, in response, the phosphor area outputs the phosphor light as a phosphor light pulse.

5. The encoder configuration of claim 4, wherein the primary light pulse duration is at most 5 microseconds.

6. The encoder configuration of claim 4, wherein the primary light pulse duration is at most 1 microsecond.

7. The encoder configuration of claim 1, wherein the primary light comprises light concentrated in a first wavelength range and the phosphor light comprises light concentrated in a second wavelength range and the encoder configuration is configured such that a signal generated by the detector portion is responsive to light in the second wavelength range that is included in the spatially modulated phosphor light pattern and relatively unresponsive to primary light in the first wavelength range.

8. The encoder configuration of claim 7, wherein the encoder configuration comprises at least one of a) a wavelength filter arranged to block light in the first wavelength range such that it does not reach the detector portion, and b) a detector portion including a photodetector that is relatively unresponsive to light in the first wavelength range.

9. The encoder configuration of claim 1, further comprising at least one of an optical deflector element and an optical scattering element arranged to distribute the primary light to the phosphor area.

10. The encoder configuration of claim 1, wherein the phosphor area is located on a surface of the scale element and extends along the measuring axis direction, and different parts of the phosphor area receive the primary light and, in response, output phosphor light from the phosphor light emitting area, depending on the relative position between the scale element and the light generator along the measuring axis direction.

11. The encoder configuration of claim 1, wherein the scale pattern has a scale pattern dimension along a direction perpendicular to the measuring axis direction, and the phosphor area has an phosphor area dimension along the direction perpendicular to the measuring axis direction, and the phosphor area dimension is at least as large as the scale pattern dimension.

12. The encoder configuration of claim 1, wherein the at least one illumination system comprises a plurality of track-specific illumination systems, the scale pattern comprises a corresponding plurality of scale track patterns that output a corresponding plurality of track-specific spatially modulated phosphor light patterns, and the detector portion comprises a plurality of corresponding detector tracks.

13. The encoder configuration of claim 12, wherein during operation:
for each of the track-specific illumination systems, its light generator generates its primary light as a primary light pulse having a primary light pulse duration and, in response, the phosphor area of that track-specific illumination system outputs its phosphor light as a track-specific phosphor light pulse;
the track-specific phosphor light pulses are provided sequentially, to provide the track-specific spatially modulated phosphor light patterns at different corresponding track-specific times; and
the detector electronics operates the corresponding detector tracks sequentially, such that each detector track detects only its corresponding track-specific spatially modulated phosphor light pattern at the corresponding track-specific time.

14. The encoder configuration of claim 12, wherein a first one of the scale track patterns comprises a periodic grating-like pattern, the track-specific illumination system corresponding to the first scale track pattern comprises a phosphor area patterned to provide a source grating, and the first scale track pattern is illuminated by phosphor light from the source grating.

15. The encoder configuration of claim 14, wherein the encoder configuration is a reflective configuration wherein the first one of the scale track patterns reflects the corresponding track-specific spatially modulated phosphor light pattern along the light path to the corresponding detector track, and that corresponding detector track and the phosphor area that is patterned to provide the source grating are located adjacent to one another along a direction transverse to the measuring axis direction.

16. The encoder configuration of claim 1, wherein the encoder configuration is a transmissive configuration wherein the scale track pattern transmits the spatially modulated phosphor light pattern along the light path to the detector portion.

17. The encoder configuration of claim 1, wherein the scale pattern comprises at least a first scale track pattern that is a periodic grating-like pattern, at least a portion of the phosphor area is patterned to provide a source grating, and the first scale track pattern is illuminated by phosphor light from the source grating.

18. The encoder configuration of claim 1, wherein the scale pattern is an absolute scale pattern comprising a plurality of scale track patterns that output a corresponding plurality of track-specific spatially modulated phosphor light patterns, and the detector portion comprises a plurality of corresponding detector tracks.

19. The encoder configuration of claim 18, wherein:
a first detector track of the plurality of detector tracks corresponds to first absolute scale track pattern that is not a grating-like pattern, and the first detector track comprises individual photodetector areas that have a dimension YDETABS along a Y direction that is perpendicular to the measuring axis direction, and
the first detector track is configured to spatially filter its received track-specific spatially modulated light pattern and output a plurality of respective position indicating signals that have respective spatial phases.

20. The encoder configuration of claim 19, wherein
the first absolute track pattern comprises geometrically congruent subtrack portions that extend along the measuring axis direction, the geometrically congruent subtrack portions configured such that:
the geometrically congruent subtrack portions are separated along the Y direction by a dimension YCENT, and YCENT is less than YDETABS,
the geometrically congruent subtrack portions each have a Y direction dimension YTOL, such that the dimensional quantity [YCENT+2(YTOL)] is greater than YDETABS, and
the geometrically congruent subtrack portions are arranged such that if one of the geometrically congruent portions is translated along the Y direction by the dimension YDETABS, then the geometrically congruent portions will nominally coincide; and
the first absolute track pattern comprises patterned signal varying portions configured such that an area of the patterned signal varying portions varies corresponding to a first periodic function of x having a spatial wavelength LABS1, where x designates an x-coordinate location along the measuring axis direction, and the first periodic function is not a square wave.

* * * * *